United States Patent
Chang

(10) Patent No.: US 7,663,071 B2
(45) Date of Patent: Feb. 16, 2010

(54) KEYPAD ASSEMBLY HAVING THREE-DIMENSIONAL PATTERNS

(75) Inventor: Jian-Li Chang, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 232 days.

(21) Appl. No.: 12/037,250

(22) Filed: Feb. 26, 2008

(65) Prior Publication Data
US 2009/0183976 A1    Jul. 23, 2009

(30) Foreign Application Priority Data
Jan. 22, 2008    (TW) ............................. 97201359 U

(51) Int. Cl.
*H01H 13/70*    (2006.01)
(52) U.S. Cl. .................... 200/345; 200/314; 362/85
(58) Field of Classification Search ............... 200/345
See application file for complete search history.

(56) References Cited

U.S. PATENT DOCUMENTS

| | | | | |
|---|---|---|---|---|
| 5,234,744 | A * | 8/1993 | Kenmochi | 428/195.1 |
| 6,196,738 | B1 * | 3/2001 | Shimizu et al. | 400/490 |
| 6,734,382 | B2 * | 5/2004 | Arai et al. | 200/512 |
| 7,414,213 | B2 * | 8/2008 | Hwang et al. | 200/341 |
| 2003/0102204 | A1 * | 6/2003 | Shimizu et al. | 200/341 |
| 2003/0221944 | A1 * | 12/2003 | Arai et al. | 200/512 |
| 2004/0211656 | A1 * | 10/2004 | Kunthady et al. | 200/341 |
| 2008/0035460 | A1 * | 2/2008 | Hwang et al. | 200/341 |
| 2008/0247538 | A1 * | 10/2008 | Wu | 379/433.01 |
| 2009/0189316 | A1 * | 7/2009 | Chang | 264/447 |
| 2009/0190990 | A1 * | 7/2009 | Chang | 400/490 |

FOREIGN PATENT DOCUMENTS

| | | |
|---|---|---|
| CN | 2544299 Y | 4/2003 |
| JP | 2000-331554 | 11/2000 |
| JP | 2000-340059 | 12/2000 |

* cited by examiner

*Primary Examiner*—Renee S Leubke
*Assistant Examiner*—Lisa Klaus
(74) *Attorney, Agent, or Firm*—Chun-Ming Shih

(57) ABSTRACT

A keypad assembly having three-dimensional patterns includes a bottom layer, a light-guiding plate, a pattern layer, a coating layer and a surface layer. The light-guiding plate is overlapped on the bottom layer. The pattern layer is provided on the light-guiding plate. A plurality of three-dimensional patterns is provided on the pattern layer. The coating layer is coated on the upper surface of the pattern layer. The surface layer is overlapped on the coating layer. The surface layer is formed with a plurality of keycaps to correspond to the three-dimensional patterns. Via the above arrangement, patterns such as characters, symbols or icons can be displayed in the keycaps in a three-dimensional manner, thereby increasing recognition and visual effect.

16 Claims, 13 Drawing Sheets

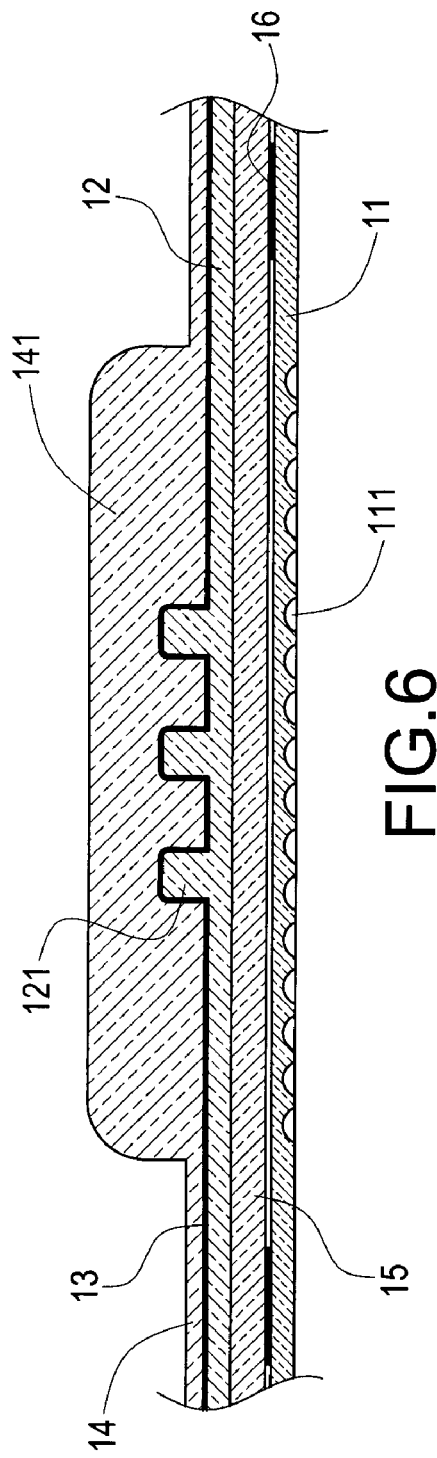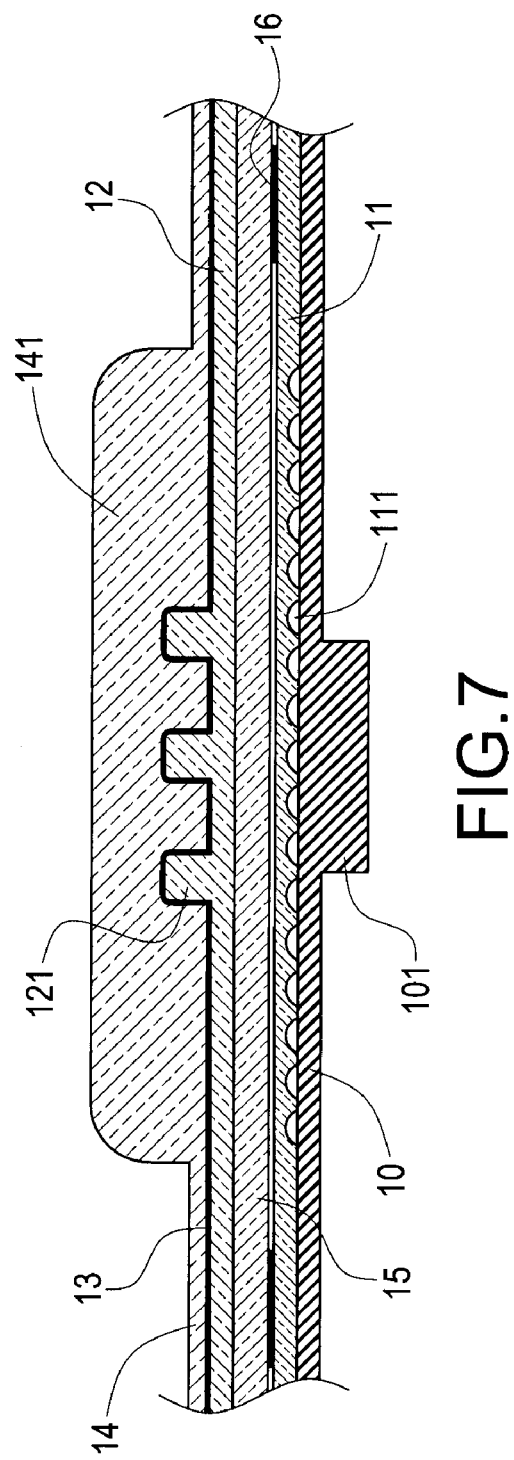

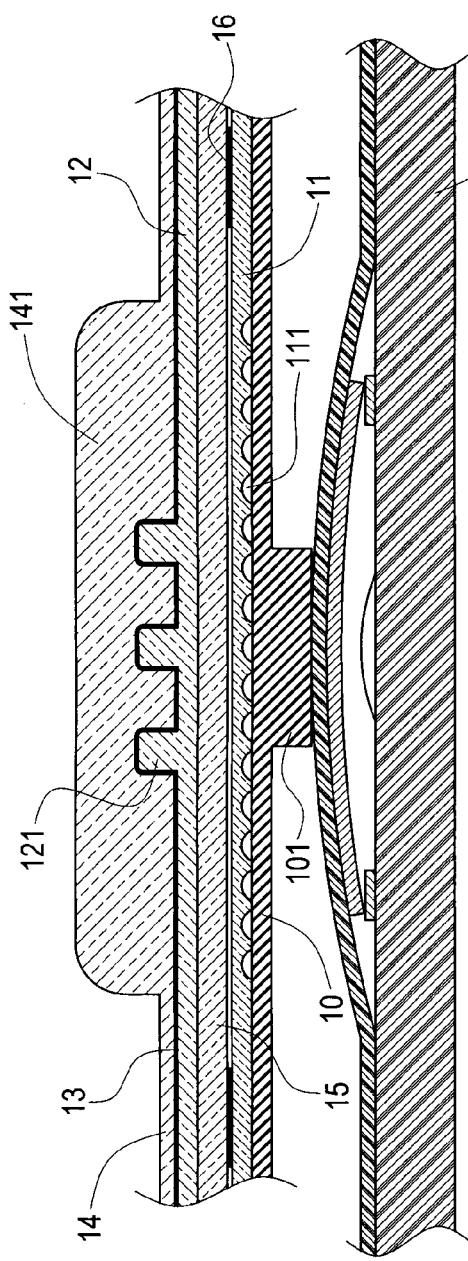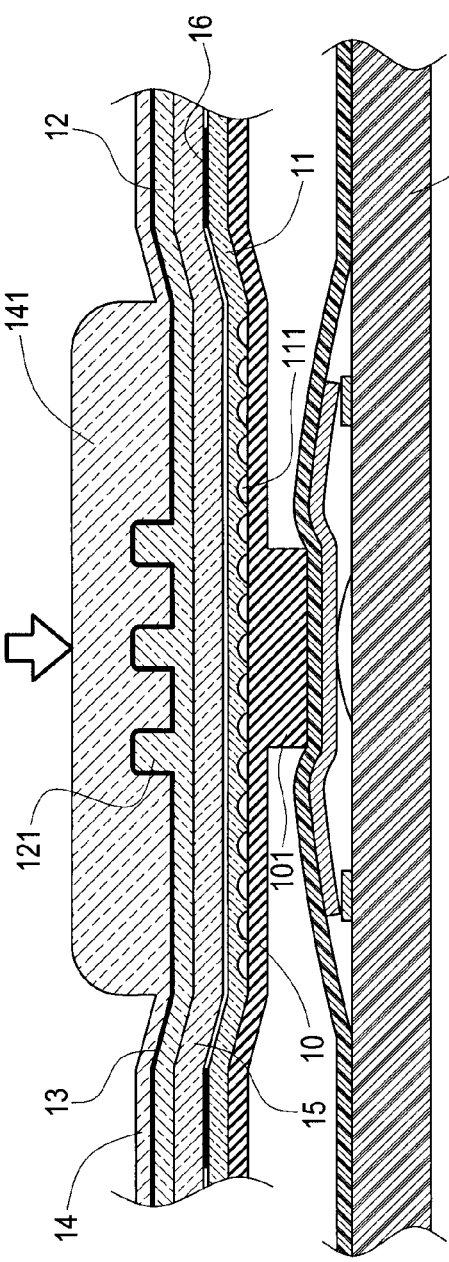

KEYPAD ASSEMBLY HAVING THREE-DIMENSIONAL PATTERNS

BACKGROUND OF THE INVENTION

1. Field of the Invention

The present invention relates to a keypad assembly, and in particular to a keypad assembly having three-dimensional patterns.

2. Description of Prior Art

With the progress and development of technology, modern consumers request electronic products such as mobile phone, personal digital assistant (PDA), ultra-micro personal computer (UMPC) to be designed in a more personalized and delicate manner. However, these electronic products can be only operated via keys so as to transmit signals from a user to the electronic products or vice versa. Moreover, the user requests the keys of the electronic product to be varied continuously. Therefore, it is an important issue for the manufacturers of keys to develop keys of more competitiveness to satisfy the request of modern people.

Japanese Patent Publication No. 2000-340059 discloses a conventional keypad assembly. As shown in FIG. 1, the keypad assembly includes a bottom layer 10a, a pattern layer 12a, a surface layer 14a and a colored light-transmitting film 17a. The front surface of the pattern layer 12a is provided with three-dimensional patterns 121a. The surface layer 14a is provided with troughs to correspond to the three-dimensional patterns 121a and the surface layer 14a is overlapped on the front surface of the pattern layer 12a. The back surface of the pattern layer 12a is printed with the colored light-transmitting film 17a. The bottom layer 10a is adhered to the underside of the light-transmitting film 17a. With the above arrangement, a keypad assembly can be achieved.

Further, Japanese Patent publication No. 2000-331554 discloses another kind of keypad assembly. The difference between this patent reference and the above-mentioned Patent Publication No. 2000-340059 lies in that troughs having three-dimensional patterns are formed in the surface layer, and the inner surface of the trough is coated with the light-transmitting colored film, so that the three-dimensional patterns can be seen in the surface layer. Although the above-mentioned keypad assembly has an effect of displaying the three-dimensional patterns, it can be only applied to a relative small keycap or single keycap because no light-guiding plate is provided. Therefore, for a keypad assembly having a large operating area, the conventional keypad assembly cannot satisfy this requirement for use. Further, Patent Publication No. 2000-340059 is only printed on the top surface of the three-dimensional patterns. Therefore, the whole shape of the three-dimensional pattern cannot be displayed sufficiently, and thus the recognition and aesthetic feeling thereof are not good.

Further, China Patent Publication No. CN2544299Y discloses another keypad assembly, which includes a surface layer, a first pattern layer, a refracting layer and a second pattern layer. The surface layer is a light-transmitting body. The first pattern layer is an opaque body that is overlapped with the surface layer. The first pattern layer is provided with first patterns formed by hollowed portions. The refracting layer is a translucent body that is located below the surface layer and the first pattern layer. The underside of the refracting layer is formed with a back surface. The second pattern layer is an opaque body that is attached to the back surface of the refracting layer. The second pattern layer is provided with second patterns formed by hollowed portions. The light emitted by light-emitting elements is projected toward the surface layer from the underside of the second pattern layer, so that the first and second patterns can be displayed on the surface layer, thereby achieving a multiple displaying effect. Although the above-mentioned keypad assembly has a multiple displaying effect, it relies on the fact that the first and second patterns are formed on the first and second pattern layer respectively. As a result, the total thickness of the key would be large and thus increasing the weight thereof. Therefore, it is not suitable for the electronic products that tend to be produced toward more and more compact. Further, the light-emitting element is formed underneath the second pattern layer, increasing the total height. As a result, the thickness of the electronic product cannot be reduced sufficiently. Moreover, the refracting layer is a translucent body, so that the recognition and aesthetic feeling of the displayed second pattern are not good.

SUMMARY OF THE INVENTION

The present invention is to provide a keypad assembly having three-dimensional pattern. With the arrangement of individual components, patterns such as characters, symbols or icons can be displayed in the keycap in a three-dimensional manner, thereby increasing the recognition and aesthetic feeling.

The present invention provides a keypad assembly having three-dimensional patterns, which includes a bottom layer, a light-guiding plate, a pattern layer, a coating layer and a surface layer. The light-guiding plate is overlapped on the bottom layer. The pattern layer is provided on the light-guiding plate. A plurality of three-dimensional patterns is provided on the pattern layer. The coating layer is coated on the upper surface of the pattern layer. The surface layer is overlapped on the coating layer. The surface layer is formed with a plurality of keycaps to correspond to the three-dimensional patterns.

BRIEF DESCRIPTION OF THE DRAWINGS

FIG. 6 is an assembled cross-sectional view showing respective layers of FIG. 5;

FIG. 7 is an assembled cross-sectional view showing respective layers of FIG. 6 and a bottom layer;

FIG. 11 is an assembled cross-sectional view showing the state before the action of the keypad assembly of FIG. 9 and the circuit board;

FIG. 12 is an assembled cross-sectional view showing the state after the action of the keypad assembly of FIG. 9 and the circuit board;

DETAILED DESCRIPTION OF THE INVENTION

Figure 1:
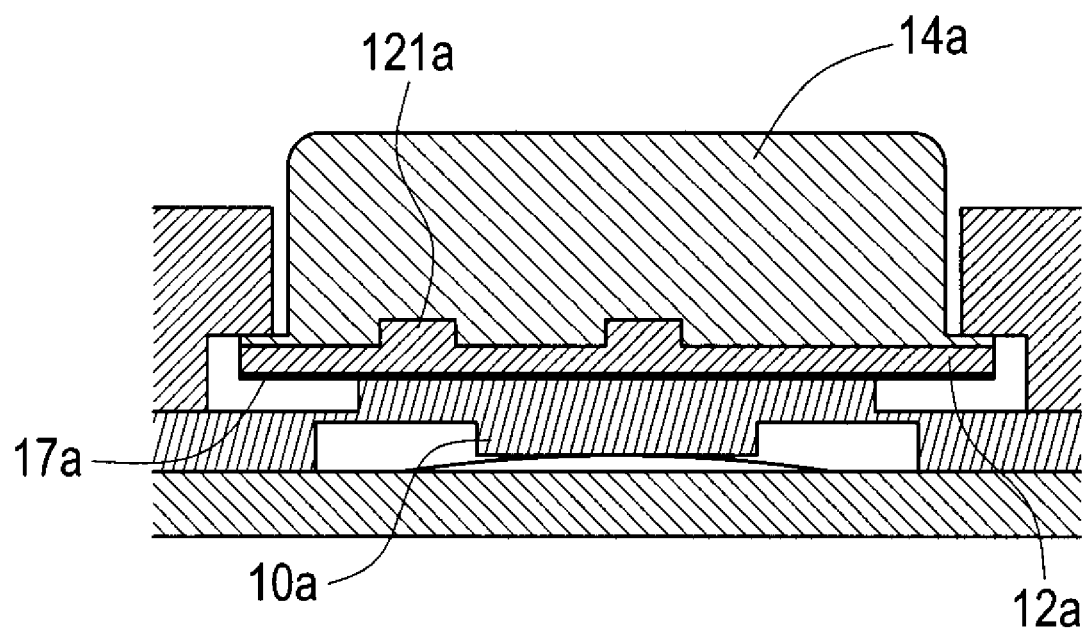
FIG. 1 is an assembled cross-sectional view showing a conventional keypad assembly.

The detailed description and technical contents of the present invention will be explained with reference to the accompanying drawings. However, the drawings are illustrative only, but not used to limit the scope of the present invention.

The present invention provides a keypad assembly having three-dimensional patterns, which includes a bottom layer 10, a light-guiding plate 11, a pattern layer 12, a coating layer 13 and a surface layer 14.

Figure 2:
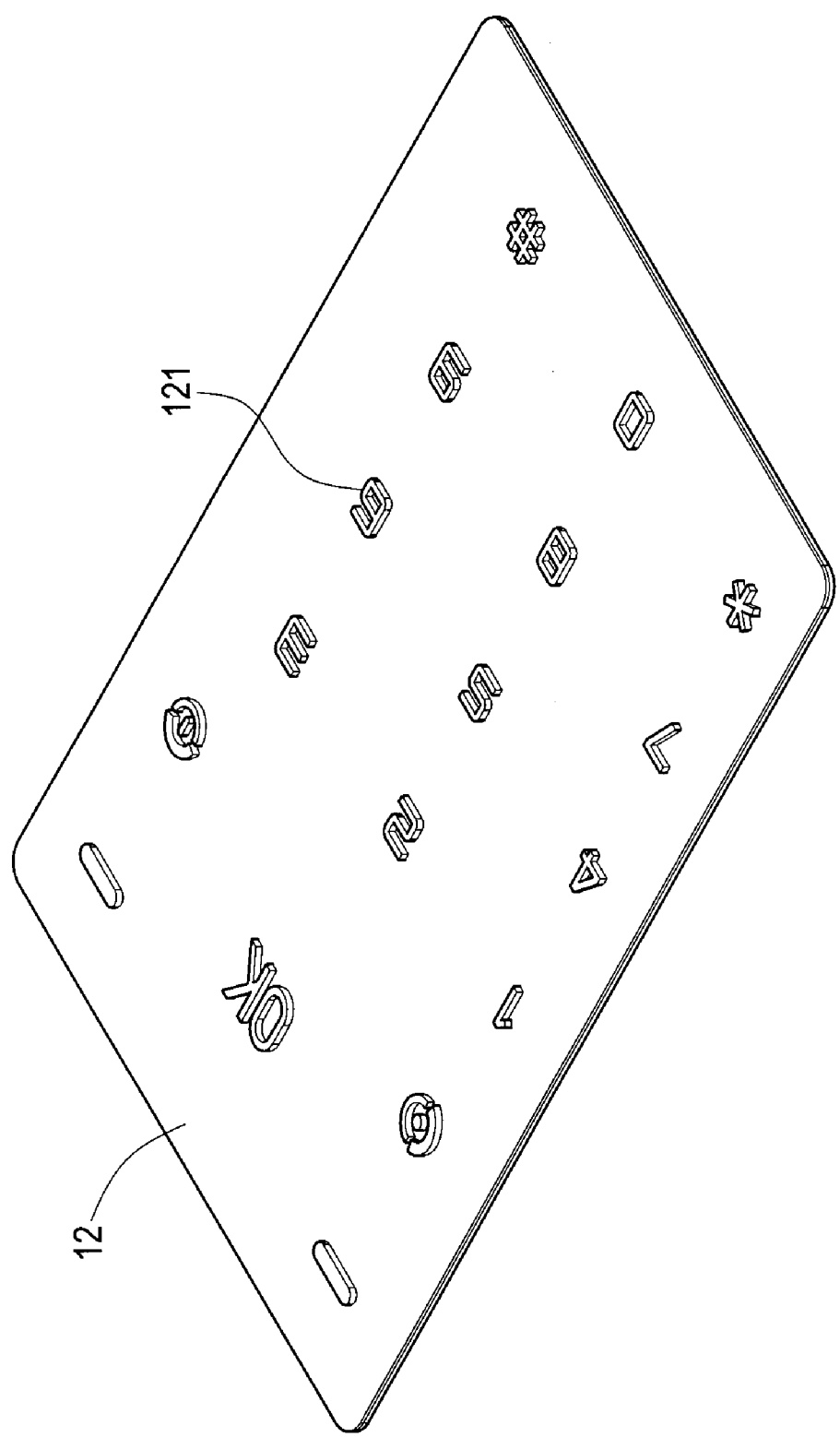
FIG. 2 is a perspective view showing the external appearance of the pattern layer of the present invention.

Please refer to FIG. 2, which is a perspective view showing the external appearance of the pattern layer of the present invention. The pattern layer 12 is made of ultra-violet curable resin and is a light-transmitting body or a translucent body. Via a mold (not shown), an upper surface of the pattern layer is formed thereon with a plurality of three-dimensional patterns 121 such as characters, symbols, icons or the like. In the present embodiment, the patterns are "0~9", "*", "#", "OK" or the like. However, the patterns are not limited thereto.

Figure 3:
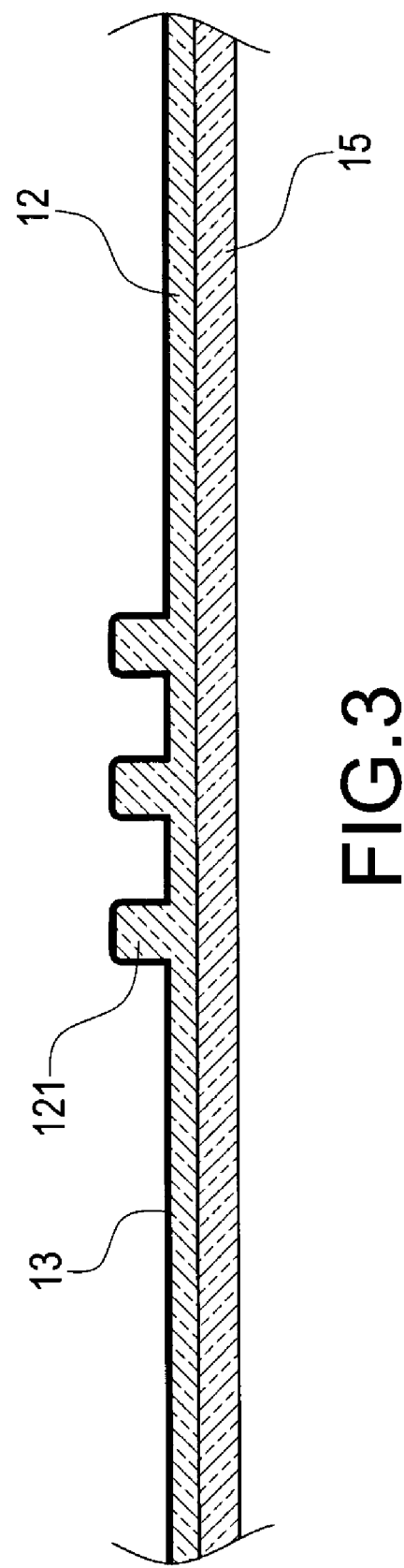
FIG. 3 is an assembled cross-sectional view showing the pattern layer and the coating layer of the present invention.

Please refer to FIG. 3, which is an assembled cross-sectional view showing the pattern layer and the coating layer of the present invention. The above-mentioned pattern layer 12 is made of a relatively soft material, thereby facilitating the combination with associated elements. The lower surface of the pattern layer 12 is overlapped with a shaping layer 15 made of plastic material. The shaping layer 15 is made of PET, PC or the mixture of acryl and PC, and can be a light-transmitting body or a translucent body. The upper surface of the pattern layer 12 is formed with a coating layer 13 by means of coating. The coating can be achieved by means of physical vapor deposition (PVD), sputtering, or multilayer coating. The material used for coating can be metal such as Ti, Ni, Cr or the alloy thereof. The light-transmitting property of the coating layer 13 can be controlled by the coated density of the coating materials.

Figure 4:
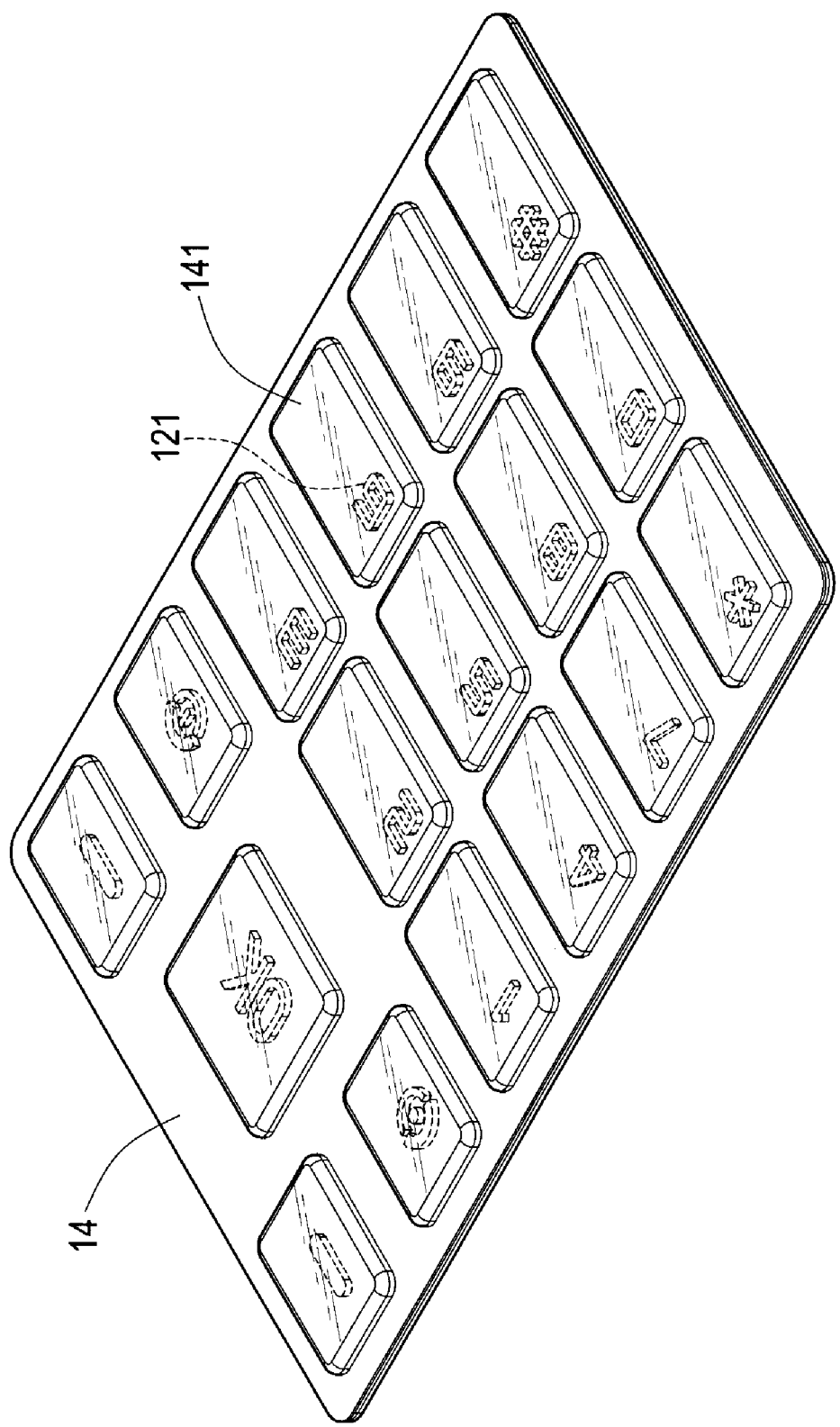
FIG. 4 is an assembled view showing the external appearance of the pattern layer, the coating layer and the surface layer of the present invention.

Please refer to FIG. 4, which is an assembled perspective view showing the external appearance of the pattern layer, the coating layer and the surface layer of the present invention. The semi-finished product shown in FIG. 3 is disposed on a particular mold (not shown). The upper surface of the coating layer 13 is partially formed with a surface layer 14. The surface layer 14 is made of ultra-violet curable resin and has light-transmitting property. The surface layer is formed thereon with a plurality of keycaps 141 corresponding to each three-dimensional pattern 121.

Figure 5:
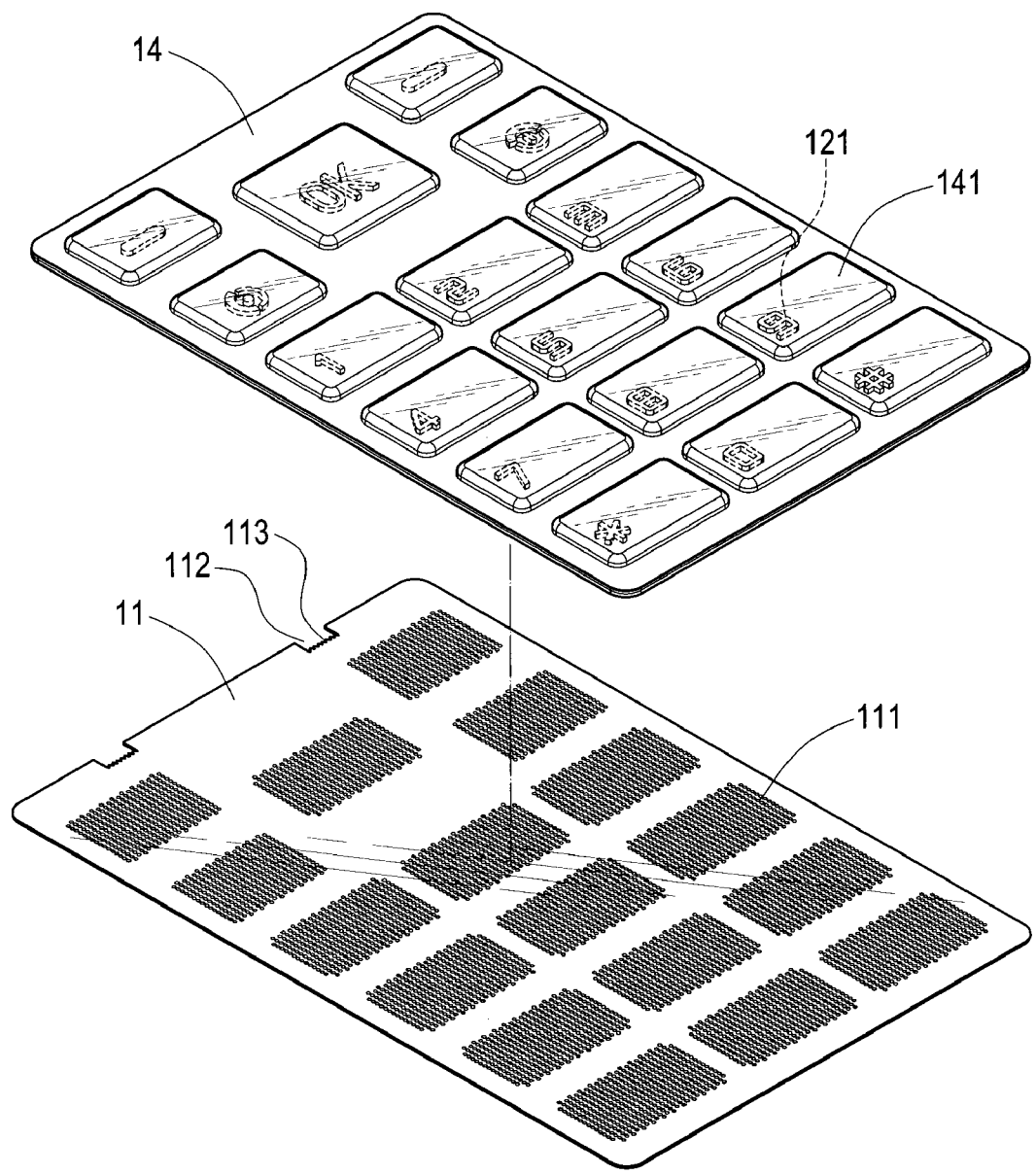
FIG. 5 is an exploded perspective view showing respective layers of FIG. 4 and a light-guiding plate.

Please refer to FIGS. 5 and 6. FIG. 5 is an exploded perspective view showing respective layers of FIG. 4 and a light-guiding plate, and FIG. 6 is an assembled cross-sectional view showing respective layers of FIG. 5. The semi-finished product shown in FIG. 4 is overlapped on the upper surface of a light-guiding plate 11. The light-guiding plate 11 is formed with a plurality of might-guiding microstructures 111 to correspond to the undersides of each keycap 141 and each three-dimensional pattern 121 respectively, so that the light can be refracted and emitted from the upside of the light-guiding plate 11. Further, one side of the light-guiding plate is provided with two notches 112. The inner surfaces of the two notches 112 are formed with tooth-like stripes 113. In addition, a binding layer 16 (FIG. 6) is connected between the light-guiding plate 11 and the shaping layer 15. The binding layer 16 may be acrylic glue and is applied to the positions avoiding the light-guiding microstructures 111.

Please refer to FIG. 7, which is an assembled cross-sectional view showing respective layers of FIG. 6 and a bottom layer. The semi-finished product shown in FIG. 6 is overlapped on a bottom layer 10. The bottom layer 10 may be made of silica gel, which is connected with the underside of the light-guiding plate 11 by means of adhesion. Alternatively, after the light-guiding plate 11 and the bottom layer 10 are connected with each other by means of a hot pressing process, the light-guiding plate 11 is adhered to the underside of the shaping layer 15 via the binding layer 16. Further, the lower surface of the bottom layer 10 is formed with bumps 101 each of which is located exactly beneath the corresponding keycap 141. Via this arrangement, the keypad assembly of the present invention can be completed.

Figure 8:
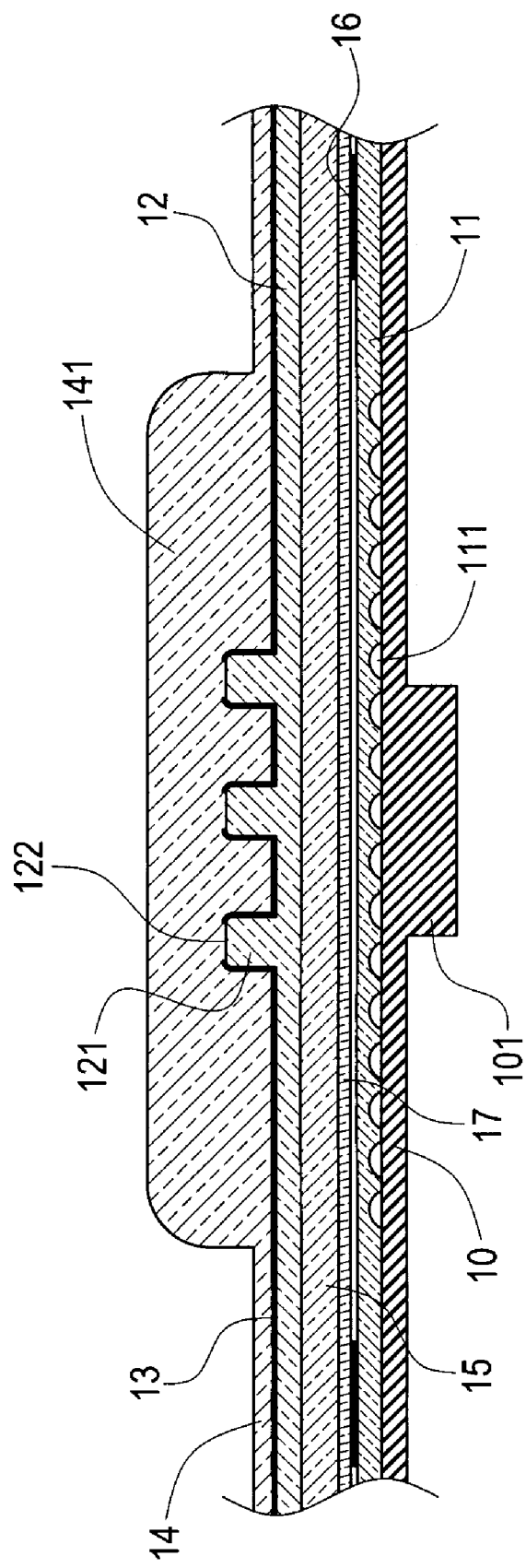
FIG. 8 is an assembled cross-sectional view showing another embodiment of the keypad assembly of the present invention.

Please refer to FIG. 8, which is an assembled cross-sectional view showing another embodiment of the keypad assembly of the present invention. In the present embodiment, the coating layer 13 on the top surface of each three-dimensional pattern 121 is formed with a highly light-transmitting region 122 by means of removing a portion of the coating layer 13 via laser. In this way, the light-transmitting property and recognition of each three-dimensional pattern 121 can be increased. Further, the bottom surface of the shaping layer 15 is printed with a colored light-transmitting coating film 17, thereby displaying variable colors on the pattern layer 12.

Figure 9:
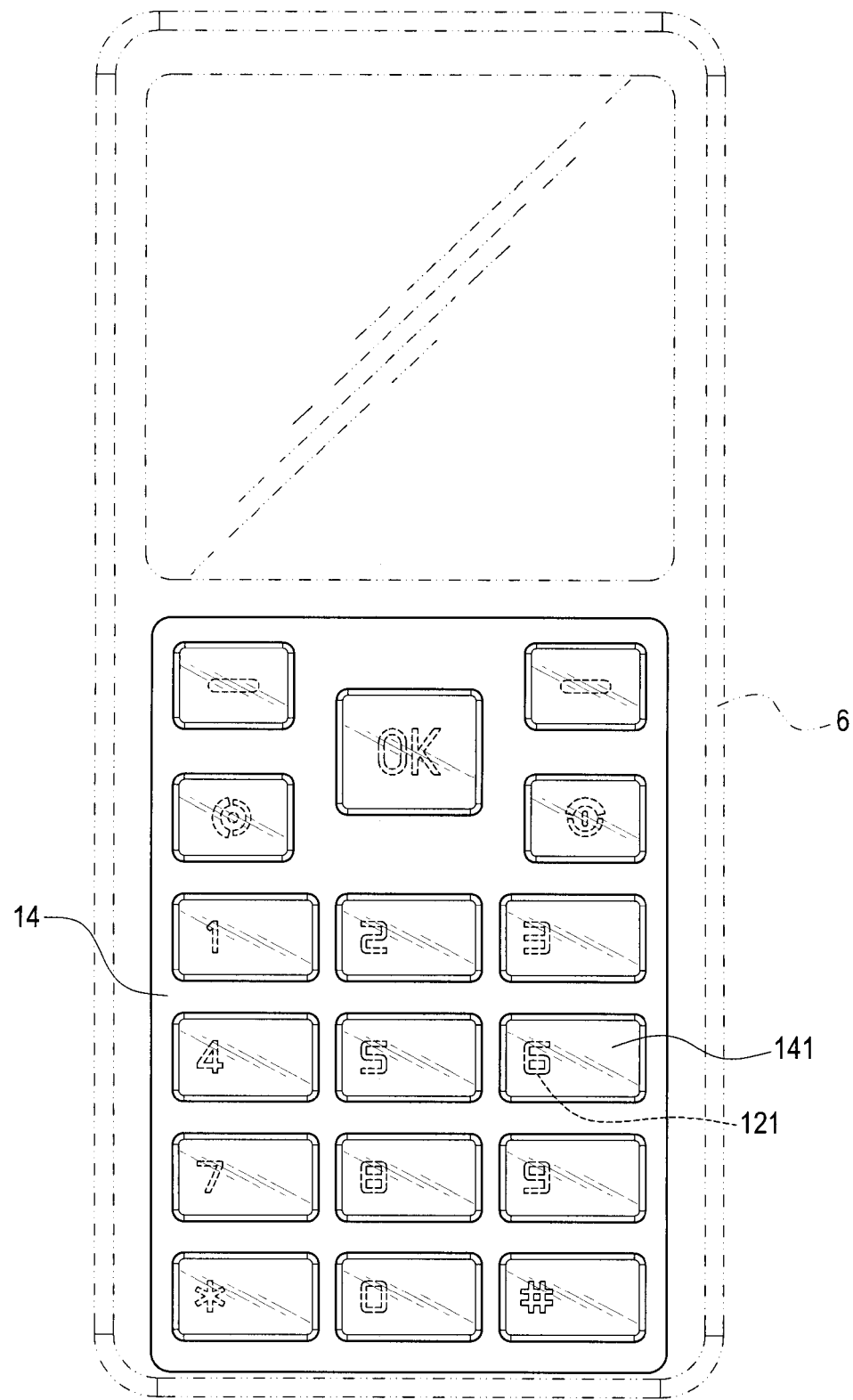
FIG. 9 is an assembled view showing the keypad assembly of the present invention being used in a mobile phone.
Figure 10:
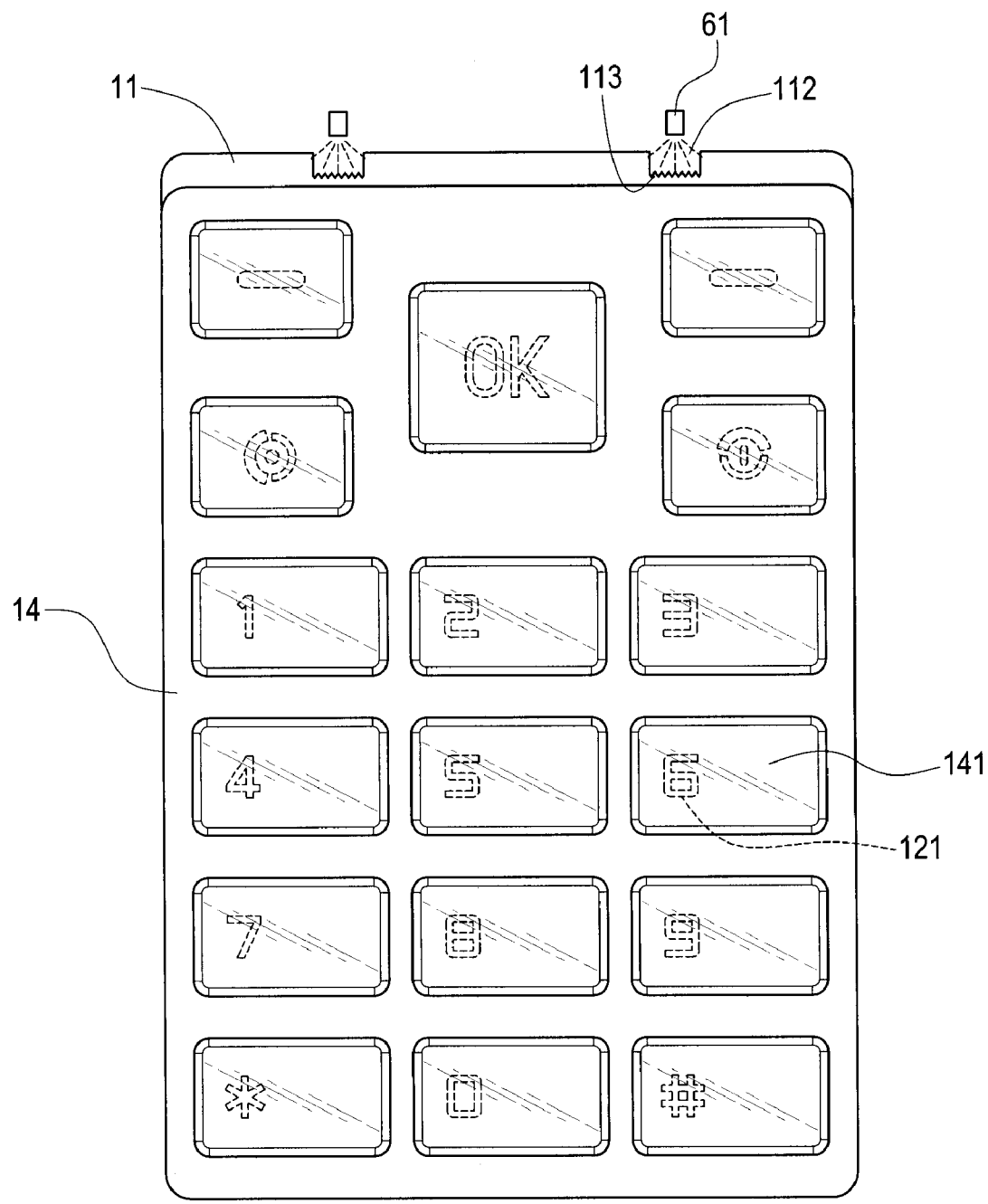
FIG. 10 is a schematic view showing the arrangement of the keypad assembly of FIG. 9 and light-emitting elements.

Please refer to FIGS. 9 to 12. FIG. 9 is an assembled view showing the keypad assembly of the present invention being used in a mobile phone. FIG. 10 is a schematic view showing the arrangement of the keypad assembly of FIG. 9 and light-emitting elements. FIG. 11 is an assembled cross-sectional view showing the state before the action of the keypad assembly of FIG. 9 and a circuit board. FIG. 12 is an assembled cross-sectional view showing the state after the action of the keypad assembly of FIG. 9 and the circuit board. The keypad assembly of the present invention can be used in a mobile phone 6. Light-emitting elements 61 (FIG. 10) and a circuit board 62 (FIG. 11) are arranged on the mobile phone 6. The two notches 112 of the light-guiding plate 11 are arranged to correspond to the light-emitting elements 61. The tooth-like stripes 113 are used to increase the ratio and uniformity of the light of the light-emitting elements 61 entered the light-guiding plate 11. The light emitted by the each light-emitting element 61 is introduced into one side of the light-guiding plate 11, refracted by the light-guiding microstructures 111, and projected toward each three-dimensional pattern 121 of the pattern layer 12. In this way, the three-dimensional effect of each three-dimensional pattern 121 can be displayed on each keycap 141. In use, pressing the keycap 141 can contact a thin conductive terminal of the circuit board 62 via the bump 101 of the bottom layer 10, thereby generating a corresponding trigger signal.

Figure 13:
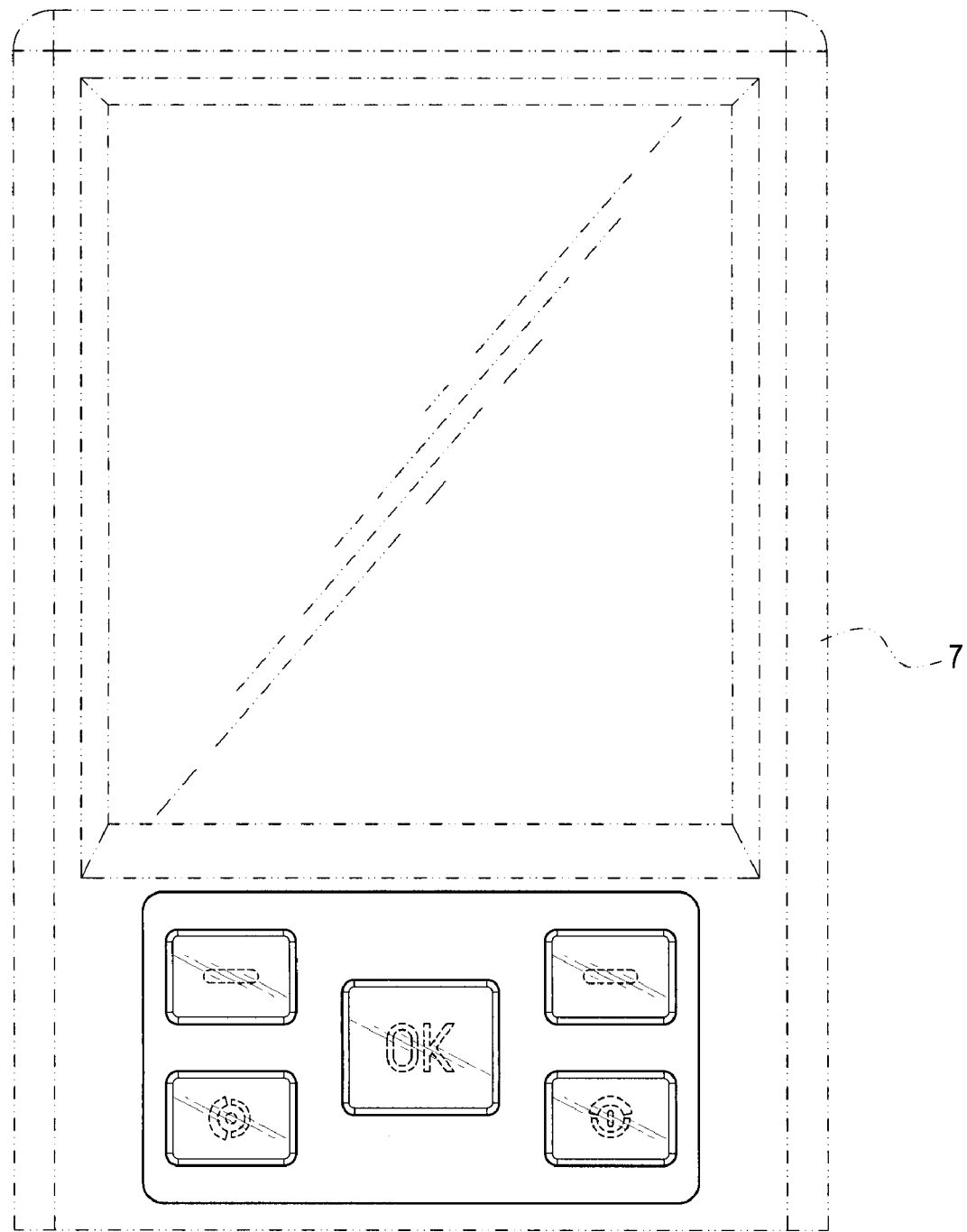
FIG. 13 is an assembled schematic view showing the keypad assembly of the present invention being used in a PDA.
Figure 14:
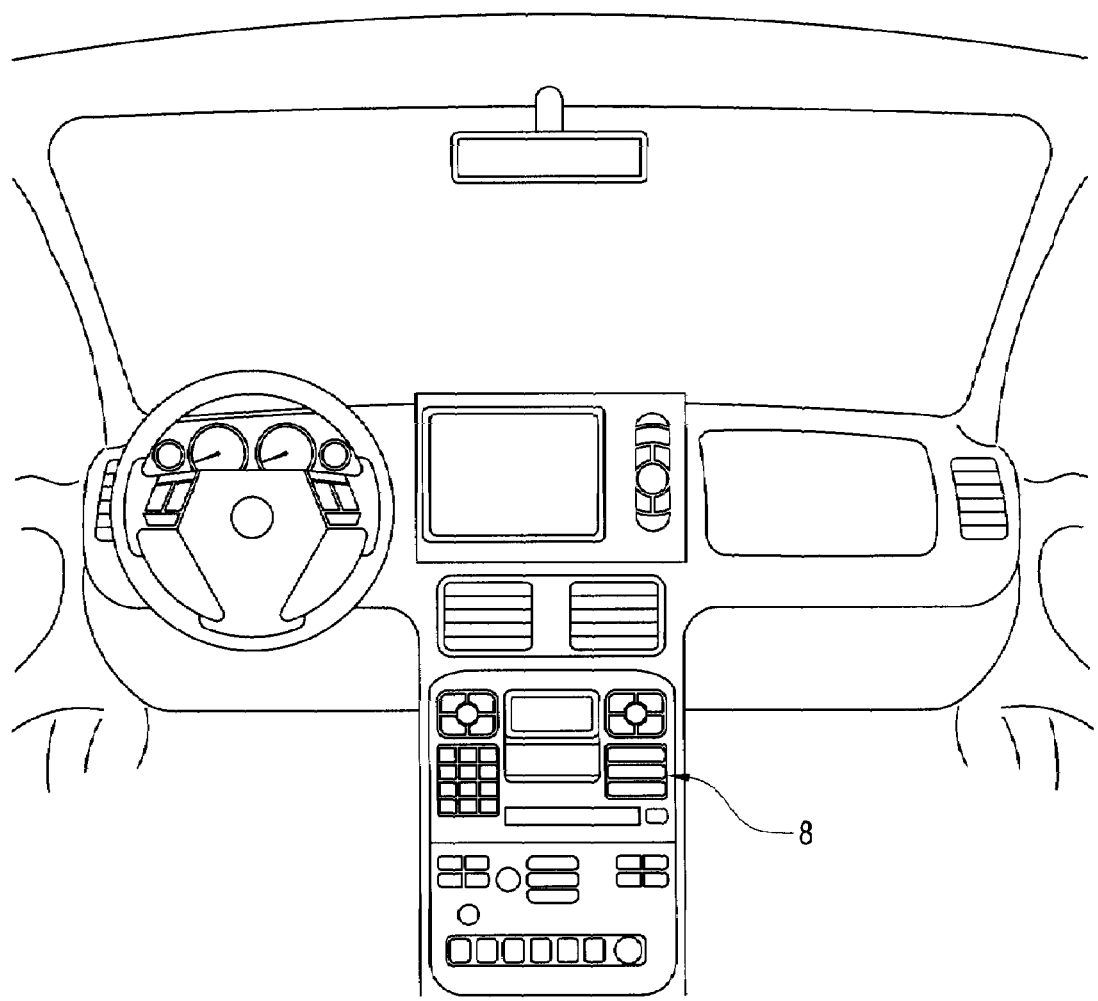
FIG. 14 is an assembled schematic view showing the keypad assembly of the present invention being used in an automobile stereo panel.
Figure 15:
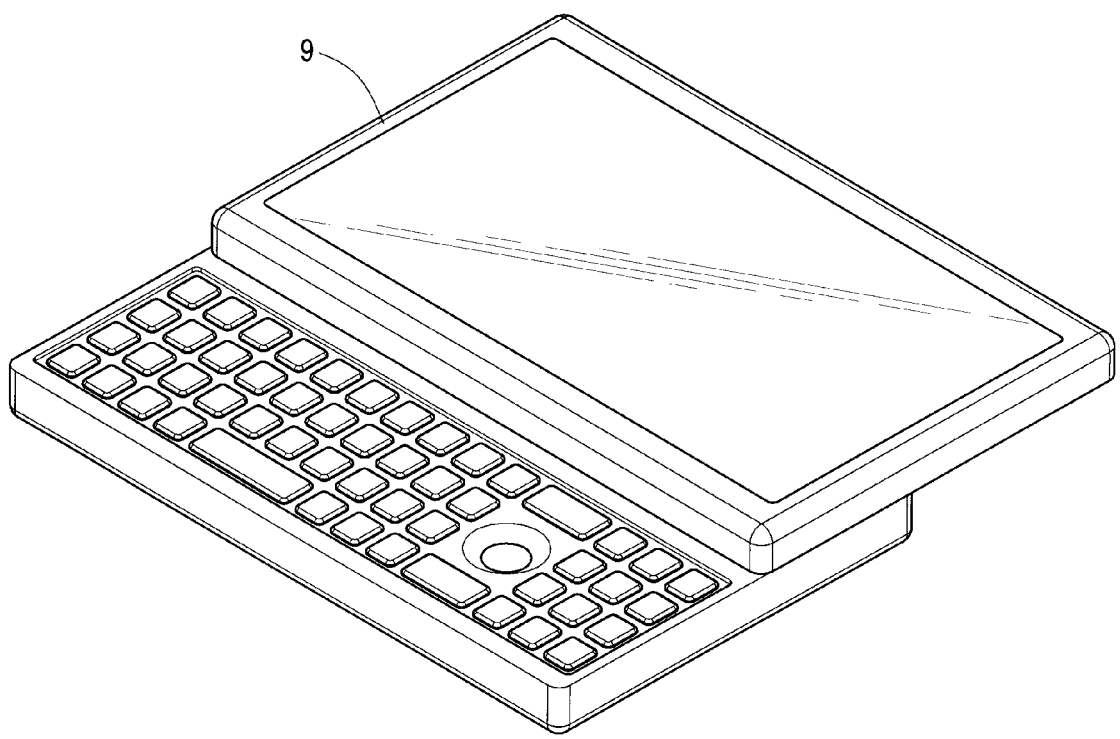
FIG. 15 is an assembled schematic view showing the keypad assembly of the present invention being used in an UMPC.

Please refer to FIGS. 13 to 15. FIG. 13 is an assembled schematic view showing the keypad assembly of the present invention being used in a PDA. FIG. 14 is an assembled schematic view showing the keypad assembly of the present invention being used in an automobile stereo panel. FIG. 15 is an assembled schematic view showing the keypad assembly of the present invention being used in a UMPC 9. In addition to the mobile phone 6, the present invention can be also used in the keys of a personal digital assistant (PDA) 7 as shown in FIG. 13, an automobile stereo panel 8 as shown in FIG. 14, or an ultra-micro personal computer (UMPC) 9 as shown in FIG. 15.

According to the above, the present invention really achieves the desired objects and solves the drawbacks of prior art. Further, the present invention has novelty and inventive steps, and thus conforms to the requirements for a utility model patent.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A keypad assembly having three-dimensional patterns, comprising:
    a bottom layer;
    a light-guiding plate overlapped on the bottom layer;
    a pattern layer provided on the light-guiding plate, the pattern layer being provided thereon with a plurality of three-dimensional patterns;
    a coating layer coated on an upper surface of the pattern layer; and
    a surface layer overlapped on the coating layer, the surface layer being formed with a plurality of keycaps to correspond to the three-dimensional patterns.

2. The keypad assembly having three-dimensional patterns according to claim 1, wherein the pattern layer is made of ultra-violet curable resin.

3. The keypad assembly having three-dimensional patterns according to claim 1, wherein the pattern layer is a light-transmitting body or a translucent body.

4. The keypad assembly having three-dimensional patterns according to claim 1, wherein the three-dimensional pattern is any one of characters, symbols, icons or the combination thereof.

5. The keypad assembly having three-dimensional patterns according to claim 1, wherein the coating layer is coated by means of physical vapor deposition, sputtering or multilayer coating.

6. The keypad assembly having three-dimensional patterns according to claim 1, wherein the surface layer is made of ultra-violet curable resin.

7. The keypad assembly having three-dimensional patterns according to claim 1, wherein the light-guiding plate is formed with a plurality of light-guiding microstructures to correspond to the undersides of the keycaps and the three-dimensional patterns respectively.

8. The keypad assembly having three-dimensional patterns according to claim 1, wherein one side of the light-guiding plate is provided with a notch, and an inner surface of the notch is formed with a tooth-like stripe.

9. The keypad assembly having three-dimensional patterns according to claim 1, further comprising a shaping layer located between the pattern layer and the light-guiding plate.

10. The keypad assembly having three-dimensional patterns according to claim 9, further comprising a colored light-transmitting film printed on one surface of the shaping layer away from the pattern layer.

11. The keypad assembly having three-dimensional patterns according to claim 9, further comprising a binding layer located between the light-guiding plate and the shaping layer.

12. The keypad assembly having three-dimensional patterns according to claim 11, wherein the binding layer is acrylic glue.

13. The keypad assembly having three-dimensional patterns according to claim 9, wherein the shaping layer is any one of PET, PC or the mixture of acryl and PC.

14. The keypad assembly having three-dimensional patterns according to claim 1, wherein the bottom layer is made of silica gel.

15. The keypad assembly having three-dimensional patterns according to claim 1, wherein a plurality of bumps are formed on one surface of the bottom layer away from the light-guiding plate to correspond to the keycaps.

16. The keypad assembly having three-dimensional patterns according to claim 1, wherein a top surface of the three-dimensional pattern is formed with a highly light-transmitting region.

* * * * *